United States Patent
Bise et al.

(10) Patent No.: US 7,854,143 B2
(45) Date of Patent: Dec. 21, 2010

(54) OPTICAL FIBER PREFORM WITH IMPROVED AIR/GLASS INTERFACE STRUCTURE

(75) Inventors: Ryan Bise, Los Gatos, CA (US); James W. Fleming, Westfield, NJ (US); George J. Zydzik, Columbia, NJ (US)

(73) Assignee: OFS Fitel LLC, Norcross, GA (US)

( * ) Notice: Subject to any disclaimer, the term of this patent is extended or adjusted under 35 U.S.C. 154(b) by 883 days.

(21) Appl. No.: 11/644,621

(22) Filed: Dec. 22, 2006

(65) Prior Publication Data

US 2008/0148777 A1    Jun. 26, 2008

(51) Int. Cl.
*C03B 29/00* (2006.01)

(52) U.S. Cl. .............................. 65/63; 65/393

(58) Field of Classification Search ........... 65/393, 65/439, 408, 409, 63, 271, 276, 292, 391
See application file for complete search history.

(56) References Cited

U.S. PATENT DOCUMENTS

| | | | |
|---|---|---|---|
| 4,661,136 A | | 4/1987 | Dorn et al. |
| 5,221,307 A | * | 6/1993 | Takagi et al. ............ 65/403 |
| 5,338,327 A | | 8/1994 | Ohga et al. |
| 5,864,644 A | | 1/1999 | DiGiovanni et al. |
| 6,053,013 A | | 4/2000 | Oh et al. |
| 6,324,871 B1 | | 12/2001 | Nakamura et al. |
| 6,493,492 B1 | | 12/2002 | Fischer |
| 6,701,753 B2 | | 3/2004 | Dong et al. |
| 6,732,545 B2 | * | 5/2004 | Cadet et al. ............ 65/17.2 |
| 6,748,767 B2 | | 6/2004 | Mandich et al. |
| 6,847,771 B2 | | 1/2005 | Fajardo et al. |
| 6,892,018 B2 | | 5/2005 | Libori et al. |
| 6,928,220 B2 | | 8/2005 | Wang et al. |
| 6,968,107 B2 | | 11/2005 | Belardi et al. |
| 7,082,242 B2 | | 7/2006 | Fajardo et al. |
| 2002/0134113 A1 | | 9/2002 | Berkey |
| 2005/0074215 A1 | * | 4/2005 | Sanghera et al. ............ 385/125 |
| 2005/0103057 A1 | * | 5/2005 | Kang et al. ............ 65/391 |
| 2005/0178160 A1 | * | 8/2005 | Baik et al. ............ 65/393 |
| 2006/0213230 A1 | | 9/2006 | Miyabe et al. |

FOREIGN PATENT DOCUMENTS

JP     10273329 A  * 10/1998

OTHER PUBLICATIONS

Takao, Kiyoshi, Production of Amorphous Glass and Drying Vessel Thereof, Oct. 13, 1998, JP 10-273329, machine translation.*

* cited by examiner

*Primary Examiner*—Queenie Dehghan

(57) ABSTRACT

An optical fiber preform comprising a plurality of longitudinal air holes is subjected to a thermal treatment (i.e., heating), coupled with the application of a compressive force on either end of the heated preform to compress the entire preform structure a predetermined amount. The thermal compression treatment has been found to smooth any roughened glass surfaces and heal microcracks that may have formed during the preform fabrication process, essentially "knitting" the glass material back together and forming a preform of improved quality over the prior art microstructured preforms.

12 Claims, 4 Drawing Sheets

OPTICAL FIBER PREFORM WITH IMPROVED AIR/GLASS INTERFACE STRUCTURE

TECHNICAL FIELD

The present invention relates to an improved quality optical fiber preform and, more particularly, to a microstructured preform formed using a thermal compression technique to improve the quality of the air/glass interfaces within the microstructured configuration.

BACKGROUND OF THE INVENTION

Several types of optical fibers require the formation of longitudinal air holes within the preform from which the fiber is ultimately drawn. For example, microstructured optical fibers are formed from preforms that include longitudinally disposed air holes. Polarization-maintaining optical fiber preforms include longitudinal holes that are subsequently filled with stress rods to control the propagating polarization state in the drawn fiber. These longitudinal holes may be formed in optical fiber preforms through a variety of conventional techniques including, but not limited to, drilling, piercing, casting or extruding.

The quality of the air/glass interfaces within optical fiber preforms including longitudinal holes is often problematic due to surface roughness, where the roughness may be a result of several different sources. For example, the glass surface may be damaged from a machining process used to drill the longitudinal holes, the nascent surface from molds and rods used in casting, or damage from de-molding operations associated with conventional Sol-gel casting.

Regardless of the source of the roughness, the roughness and associated microcracks have been found to attribute to increased signal loss in the drawn optical fiber. In particular, the presence of roughness and microcracks within a microstructured optical fiber (or any fiber including longitudinally disposed components, such as glass rods) leads to loss associated with optical signal scattering and non-uniform hole size in the drawn fiber. Further, if the preform is etched in a hydrofluoric (HF) solution (a conventional processing step), the presence of the etchant will allow for propagation of the already-present microcracks. Pressurization of the preform during draw will also allow for the microcracks to propagate. If the microcrack presence is severe enough, the internal air holes will connect, destroying the fiber geometry and limiting the ability to form fibers with relatively large air/fill fraction configurations (e.g.,>50%).

With respect to polarization-maintaining optical fiber, surface roughness has been found to contribute to the formation of bubbles and distortion of the stress rods, both of which degrade the polarization cross-talk parameter. In stretching preforms made with drilled and polished holes, the surface defects become extended in length, resulting in a defect known as "fiber air lines", which degrade the ability to perform fusion splices within the drawn fiber.

In light of all of the above, a need remains in the art for an optical fiber preform well-suited for configurations including longitudinal air holes, such as microstructured fiber preforms or polarization-maintaining optical fiber preforms.

SUMMARY OF THE INVENTION

The need remaining in the prior art is addressed by the present invention, which relates to an improved quality optical fiber preform and, more particularly, to a microstructured preform formed using a thermal compression treatment, prior to drawing the fiber, to improve the quality of the air/glass interfaces within the microstructured configuration.

In accordance with the present invention, an optical fiber preform comprising a plurality of longitudinal air holes is subjected to a thermal treatment (i.e., heating), coupled with the application of a compressive force on either end of the heated preform to compress the entire preform structure a predetermined amount. Following the compression, the preform may be stretched and then, ultimately, drawn into fiber. The thermal treatment has been found to smooth any roughened glass surfaces and heal microcracks that may have formed during the preform fabrication process, essentially "knitting" the glass material back together and forming a preform of improved quality over the prior art microstructured preforms.

In one embodiment of the invention, a positive or negative air pressure may be forced (blown) through the longitudinal air holes during the thermal treatment to either increase or decrease the diameter of the air holes running along the longitudinal extent of the preform.

Other and further embodiments and features of the invention will become apparent during the course of the following discussion and by reference to the accompanying drawings.

BRIEF DESCRIPTION OF THE DRAWINGS

Referring now to the drawings.

DETAILED DESCRIPTION

Figure 1:
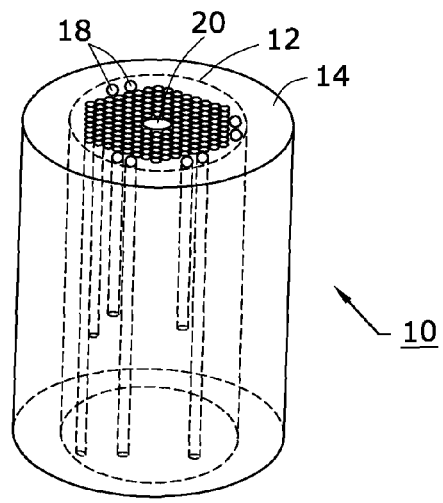
FIG. 1 is an isometric view, and FIG. 2 a cut-away top view, of an exemplary fiber preform including a plurality of longitudinal air holes that may be subject to rough surfaces and the formation of microcracks during preform fabrication.
Figure 2:
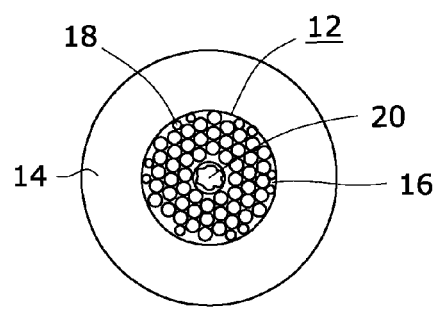

FIG. 1 illustrates, in an isometric view, a typical microstructured prior art optical fiber preform 10. A cut-away top view of preform 10 is shown in FIG. 2. Microstructured preform 10 includes an inner region 12 and an outer region 14. Inner region 12 is formed of a suitable optic fiber material (such as, for example, silica) and includes a plurality of longitudinal air holes 18. The particular arrangement of FIG. 1 also includes a hollow core region 20. For embodiments where optical preform 10 is utilized to fabricate polarization-maintaining fiber, inner region 12 may further comprise a plurality of glass rods 22 disposed within selected air holes 18, used to provide longitudinal mechanical strength to the arrangement. Outer region 14 is utilized as a sleeve to support the structure of inner region 12. The remainder of the following discussion will simply reference to the preform as a "microstructured preform". It is to be understood that this term equally applies to polarization-maintaining optical preforms, which are also formed to include longitudinal air holes during process and thus create the same surface roughness problems.

Figure 3:
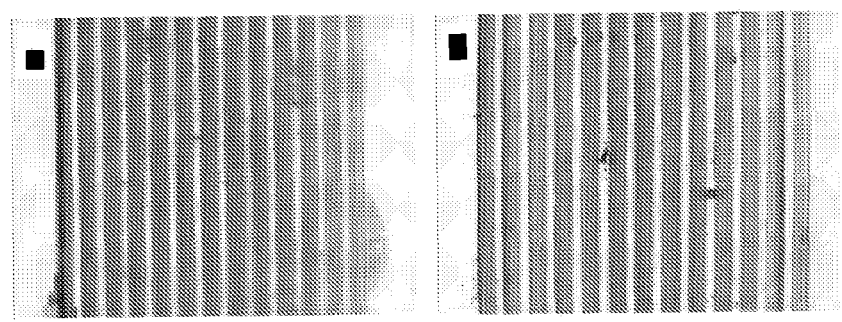
FIG. 3 contains a side view of a conventional prior art microstructured optical preform, with FIG. 3(a) illustrating the preform prior to performing a preform stretching operation and FIG. 3(b) illustrating the preform after the preform stretching operation.

As mentioned above, there exist various techniques (well known in the art) to form the plurality of longitudinal air holes 18 within preform 10. These techniques include, but are not limited to, drilling, etching, the use of molds and casting forms, and the like. The quality of the large number of air/glass interfaces within optical fiber preforms including longitudinal holes is often problematic due to surface roughness, where the roughness may be a result of several different sources. Many of these microstructured optical performs also include microcracks, where these microcracks are known to propagate along a particular air/glass interface as the preform is "stretched" at the beginning of the fiber draw process. FIG. 3 contains a photograph of a conventional prior art microstructured optical preform (side view), where the illustration of FIG. 3(*a*) illustrates the preform prior to stretching. A number of microcracks (denoted as "M" in the illustration) are evident in this view. These microcracks are shown as being larger and more pronounced in the view of FIG. 3(*b*), which illustrates the same optical preform—subsequent to the conventional stretching operation.

Moreover, if the preform is etched in an HF solution (a conventional processing step, as mentioned above), the presence of the etchant will encourage the further propagation and/or enlargement of the microcracks along a particular air/glass interface. Pressurization of the preform during draw (another common fabrication environment) will also allow for the microcracks to propagate/enlarge. If the microcrack presence is severe enough, the internal air holes will connect, destroying the fiber geometry and limiting the ability to form fibers with relatively large air/fill fraction configurations (e.g., >50%). While the following discussion will emphasize the ability of the inventive thermal treatment process to eliminate microcracks, it is to be understood that in its most general application the method of the present invention is utilized to reduce/eliminate surface roughness at the air/glass interfaces in general, that is, to "heal" all of the various surface defects associated with the formation of longitudinal air holes.

Figure 4:
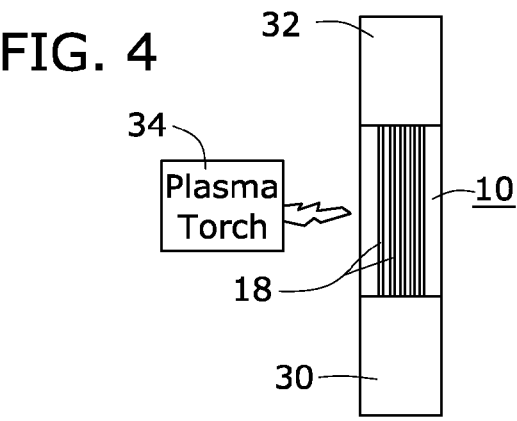
FIGS. 4-6 illustrate an exemplary process of the present invention for thermally treating a preform to reduce rough surfaces and microcracks.
Figure 5:
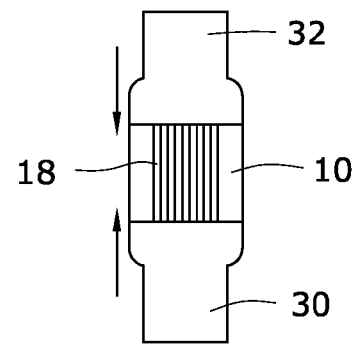
Figure 6:
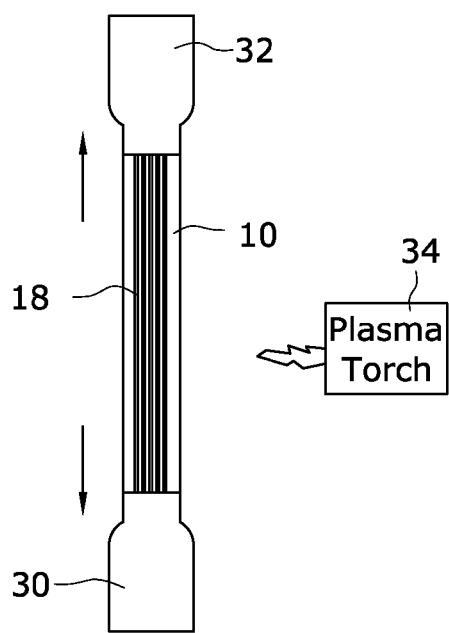

FIGS. 4-6 illustrate an exemplary set of thermal processing steps that have been found, in accordance with the present invention, to treat the air/glass interfaces within a microstructured optical fiber preform in a manner such that the surface roughness and microcracks are essentially eliminated, thus improving the quality of the optical fiber ultimately drawn from the microstructured preform. In particular, and as discussed in detail below, a novel controlled compression process has been found to "heal" the damage created by the preform fabrication process.

Referring to FIG. 4, the thermal treatment of the present invention begins with attaching a pair of glass handles 30, 32 to opposite ends of a microstructured optical fiber preform, such as preform 10 illustrated above. Once handles 30 and 32 have been attached, the arrangement is mounted in a lathe (not shown) or similar arrangement capable of supporting the arrangement during processing. A plasma torch 34 is used to heat preform 10 to a temperature at which the glass material will flow under stress. For example, a temperature of about 2000° C. has been suitable for this purpose. It is to be understood that various other conventional heat sources, such as an oxy-hydrogen torch or furnace may be used in performing the method of the present invention.

When the temperature reaches the desired glass flow temperature, a compressive force $F_c$ is applied against handles 30 and 32, as shown in FIG. 5. Compression is preferably accomplished while also rotating preform 10 within a lathe and traversing plasma torch 34 along the rotating preform. The traverse velocity may be, for example, about 2 cm/min. Along with the transversal heating, handles 30 and 32 are simultaneously moved closer together until the desired amount of compression is obtained, where the diameter of the preform may be used as the measure of sufficient compression. Referring to FIGS. 4 and 5, an increase in the diameter of preform 10 is illustrated as diameter $d_i$ for the "initial" diameter of preform 10 (for example, 35 mm) in FIG. 4, and $d_c$ as the "compressed" diameter of preform 10 (for example, 42 mm) in FIG. 5. It has been found that performing compression during this initial heating step will knit together any internal microcracks, and heal surface roughness (i.e., air/glass interfaces along longitudinal holes) through viscous flow.

Following the compression, preform 10 may be stretched prior to being drawn down into fiber (as in conventional preform fabrication), this step being illustrated in FIG. 6 with the "stretching force" illustrated by arrows $F_s$. Again, preform 10 is rotated and heated with a transversal movement of, for example, plasma torch 34, during the stretching. The stretched diameter, denoted $d_s$ may also be a predetermined value utilized to determine when the process is finished (for example, a stretched diameter $d_s$ of 25 mm). Stretching may be performed in a single pass, or with multiple passes. For the stretching operation, the velocity of plasma torch 34 can be controlled, in one instance, by utilizing a feedback signal that monitors the current diameter of the preform.

As mentioned above, it is possible to modify the diameter of the longitudinal air holes during the thermal treatment process of the present invention. In particular, during either the compression step or the stretching step (or both), a gas may be flowed through the air holes. A positive pressure flow will increase the diameter of the air holes, while a negative pressure flow will decrease the diameter of the longitudinal air holes.

Figure 7:
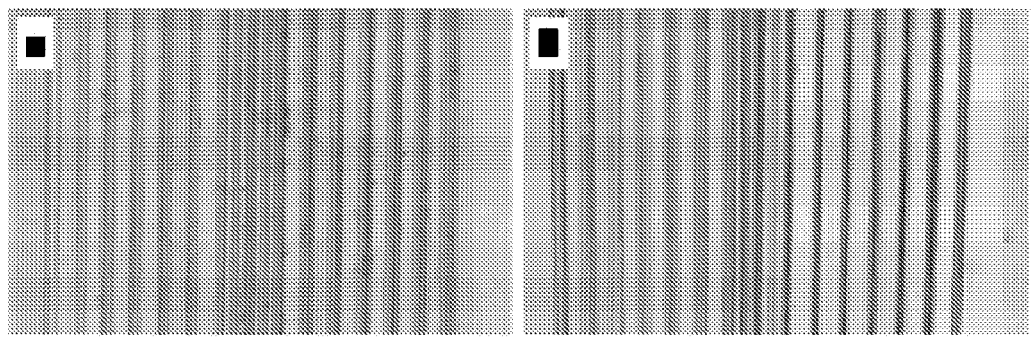
FIG. 7 contains a side view of a microstructured optical preform, with FIG. 7(a) illustrating the preform prior to the inventive thermal treatment, and FIG. 7(b) illustrating the preform subsequent to the inventive thermal treatment.

FIG. 7 contains actual photographs illustrating the improvement in preform quality associated with the thermal compression process of the present invention. FIG. 7(*a*) is a photograph (side view) of an exemplary microstructured preform prior to thermal treatment. The darker regions correspond to the longitudinal air holes, while the bright regions are the silica material of the preform. Similar to the illustrations of FIG. 3, various "microcracks" are evident in the photograph of FIG. 7(*a*). Subsequent to the thermal compression/stretching process of the present invention, these microcracks have been virtually eliminated, as shown in the photograph of FIG. 7(*b*).

Figure 8:
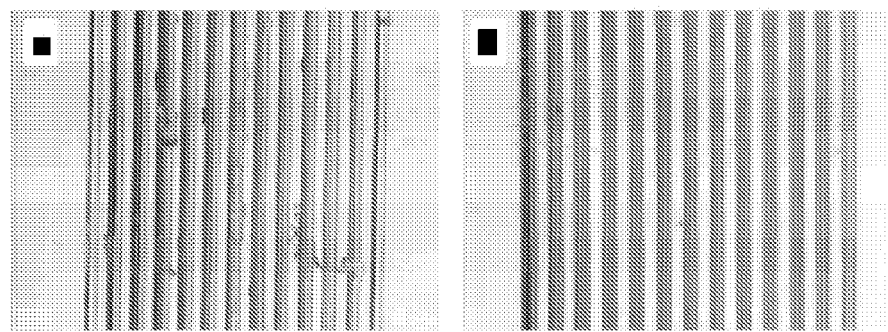
FIG. 8 illustrates a comparison of microstructured preforms subjected to an etch in hydrofluoric acid, with FIG. 8(a) illustrating a conventional, prior art preform and FIG. 8(b) illustrating a preform formed in accordance with the present invention.

One prior art technique for increasing the diameter of the air holes is to subject the preform to an etch in an acidic solution, such as hydrofluoric acid. However, the HF etch operation has been found to increase the severity of the already-present microcracks within the preform. FIG. 8(*a*) illustrates an exemplary prior art microstructured preform that has been subjected to an HF etch process. The HF etch of this prior art preform shows several large defects that can be attributed to preferential etching along the microcracks of the original preform. In contrast, the use of the thermal treatment process of the present invention prior to an HF etch will minimize/eliminate the microcracks and result in an improved quality preform, as evident by the photograph of FIG. 8(b).

Figure 9:
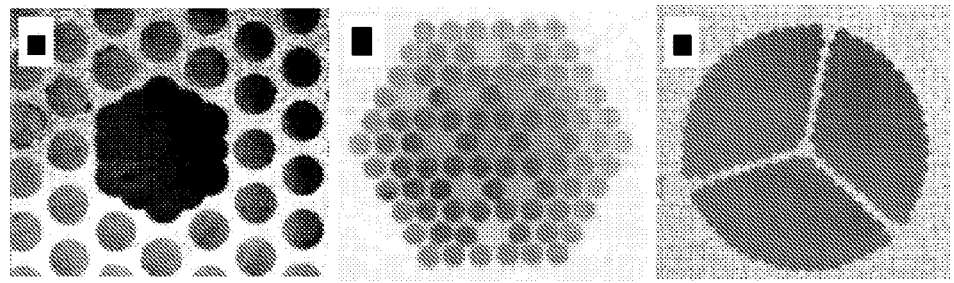
FIG. 9 illustrates cross-sectional images of microstructured preforms having a relatively large air/fill fraction, formed in accordance with the present invention.

The thermal treatment of the present invention, as mentioned above and indicative from the illustrations of FIGS. 7(b) and 8(b), yields an essentially uniform surface finish along each of the air/glass interfaces within a microstructured preform. As a result, a microstructured preform with a relatively high air/fill fraction can be created, as shown in FIG. 9. For example, FIG. 9(a) contains a cross-sectional image of a microstructured preform with a 70% air/fill fraction. The image of FIG. 9(b) is associated with an 85% air/fill fraction and FIG. 9(c) with a 99% air/fill fraction. Such large fractions would be difficult, if not impossible, to create without the thermal compression treatment of the present invention. Each of the images illustrates that the hole sizes are uniform throughout the cross-section, indicating that the thermal treatment does not alter or distort the topology of the holes.

Figure 10:
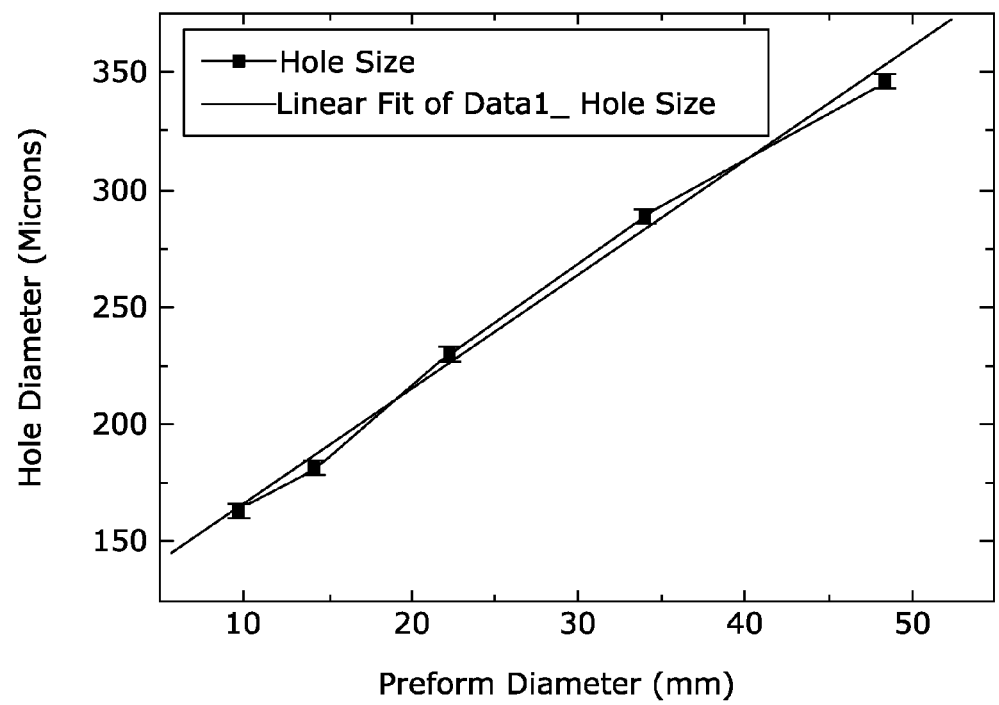
FIG. 10 is a graph of hole size as a function of preform diameter, illustrating the change in air hole size as a function of preform diameter.

One concern with the use of a thermal compression process is that the high temperature of the plasma torch may cause some of the holes to collapse or distort. FIG. 10 contains a plot associated with a preform that was first compressed from a diameter of 35 mm to a diameter of 42, and then stretched to 15 mm. The air hole sizes were measured as a function of the preform diameter. The hole size shows a consistently linear dependence on the preform diameter, indicating that there is no significant change in the relative hole size within the microstructured preform during the thermal treatment process of the present invention.

It is to be understood that there exist various modifications that may be made to the inventive thermal treatment process including, but not limited to, the diameter achieved during compression, the compressive and tensile applied forces, the air-fill fraction, and the like. Indeed, the spirit and scope of the present invention is intended to be limited only by the claims appended hereto.

What is claimed is:

1. A method for eliminating air-glass interface imperfections within a microstructured optical fiber preform, the method comprising the steps of:
    heating a selected portion of the longitudinal extent of a microstructured preform to a temperature sufficient for viscous flow to be initiated; and
    longitudinally compressing the heated, selected portion of said preform using a force to heal air-glass interface imperfections along the microstructured optical fiber preform.

2. The method as defined in claim 1, wherein the method further comprises the step of:
    longitudinally stretching the compressed, healed preform to a diameter suitable for subsequent drawing of the preform into a microstructured optical fiber.

3. The method as defined in claim 1, wherein the method initially comprises the step of:
    placing a microstructured preform between a pair of support handles; and
    the step of longitudinally compressing the heated, selected portion of said preform includes the step of applying the compressive force to each support handle.

4. The method as defined in claim 1, wherein the method further comprises the step of rotating the microstructured preform during the heating and compressing steps.

5. The method as defined in claim 1, wherein the method further comprises the step of:
    traversing a heat source in a longitudinal direction along the microstructured preform during the heating and compressing steps.

6. The method as defined in claim 5 where the heat source is traversed at a rate of approximately 2 cm/min.

7. The method as defined in claim 1, wherein during the heating step a plasma torch is used to perform the heating.

8. The method as defined in claim 1, wherein during the heating step an oxy-hydrogen torch is used perform the heating.

9. The method as defined in claim 1, wherein during the heating step a furnace is used perform the heating.

10. The method as defined in claim 1, wherein the preform is heated to a temperature of approximately 2000° C.

11. The method as defined in claim 1 wherein the method further comprises the step of:
    flowing a positive pressure gas through a plurality of longitudinal air holes in the microstructured optical fiber preform to increase the diameter of the plurality of longitudinal air holes.

12. The method as defined in claim 1 wherein the method further comprises the step of
    flowing a negative pressure gas through a plurality of longitudinal air holes in the microstructured optical fiber preform to decrease the diameter of the plurality of longitudinal air holes.

* * * * *